US010407036B2

(12) United States Patent
Okano et al.

(10) Patent No.: US 10,407,036 B2
(45) Date of Patent: Sep. 10, 2019

(54) VEHICLE BRAKE DEVICE

(71) Applicants: ADVICS CO., LTD., Kariya-shi, Aichi (JP); TOYOTA JIDOSHA KABUSHIKI KAISHA, Toyota-shi, Aichi (JP)

(72) Inventors: Takahiro Okano, Chiryu (JP); Masaki Ninoyu, Obu (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 4 days.

(21) Appl. No.: 15/541,210

(22) PCT Filed: Jan. 15, 2016

(86) PCT No.: PCT/JP2016/051098
§ 371 (c)(1),
(2) Date: Jun. 30, 2017

(87) PCT Pub. No.: WO2016/121527
PCT Pub. Date: Aug. 4, 2016

(65) Prior Publication Data
US 2018/0015914 A1 Jan. 18, 2018

(30) Foreign Application Priority Data
Jan. 30, 2015 (JP) ................... 2015-016729

(51) Int. Cl.
*B60T 8/34* (2006.01)
*B60T 13/68* (2006.01)
(Continued)

(52) U.S. Cl.
CPC ............... *B60T 8/34* (2013.01); *B60T 7/042* (2013.01); *B60T 8/4077* (2013.01);
(Continued)

(58) Field of Classification Search
CPC .......... B60T 7/042; B60T 8/40; B60T 8/4077; B60T 13/146; B60T 13/686
See application file for complete search history.

(56) References Cited

U.S. PATENT DOCUMENTS

2012/0145494 A1  6/2012  Hatano
2016/0339887 A1* 11/2016  Okano ................. B60T 8/4077
(Continued)

FOREIGN PATENT DOCUMENTS

JP   2005-038314 A   2/2005
JP   2008-290487 A   12/2008
(Continued)

OTHER PUBLICATIONS

International Search Report (PCT/ISA/210) dated Mar. 22, 2016, by the Japanese Patent Office as the International Searching Authority for International Application No. PCT/JP2016/051098.
(Continued)

*Primary Examiner* — Bradley T King
(74) *Attorney, Agent, or Firm* — Buchanan Ingersoll & Rooney PC

(57) ABSTRACT

A vehicle brake device includes a hydraulic pressure control portion which performs a feed-back control so that an actual hydraulic pressure of the brake fluid approximates an instruction target pressure and a target pressure setting portion which sets the instruction target pressure to a value closer to the actual hydraulic pressure side than an operating target pressure, when a pressure deviation between the operating target pressure which is a target value of the hydraulic pressure of the brake fluid corresponding to a brake operation and the actual hydraulic pressure is larger than a first pressure difference and at the same time when the actual hydraulic pressure is approaching to the operating target pressure.

3 Claims, 5 Drawing Sheets

(51) Int. Cl.
*B60T 7/04* (2006.01)
*B60T 8/40* (2006.01)
*B60T 13/14* (2006.01)
*B60T 13/66* (2006.01)

(52) U.S. Cl.
CPC .......... *B60T 13/146* (2013.01); *B60T 13/662* (2013.01); *B60T 13/686* (2013.01)

(56) References Cited

U.S. PATENT DOCUMENTS

2017/0036658 A1* 2/2017 Okano .................... B60T 7/042
2017/0120882 A1* 5/2017 Ninoyu ................ B60T 8/4077

FOREIGN PATENT DOCUMENTS

| | | |
|---|---|---|
| JP | 2010-076585 A | 4/2010 |
| JP | 2012-091577 A | 5/2012 |
| WO | WO 2010/143660 A1 | 12/2010 |

OTHER PUBLICATIONS

Written Opinion (PCT/ISA/237) dated Mar. 22, 2016, by the Japanese Patent Office as the International Searching Authority for International Application No. PCT/JP2016/051098.

* cited by examiner

VEHICLE BRAKE DEVICE

TECHNICAL FIELD

This invention relates to a vehicle brake device.

BACKGROUND ART

Generally, a feed-back control is adopted for a hydraulic pressure control in a vehicle brake device. According to the feed-back control, a controlled pressure amount is decided to have the hydraulic pressure of a control object approximate quickly to a target pressure which is a pressure decided in response to a brake operation. Such feed-back control is shown, for example, in Japanese Patent Publication JP2005-38314 A

CITATION LIST

Patent Literature

Patent Literature 1: JP2005-38314 A

SUMMARY OF INVENTION

Technical Problem(s)

However, in a feed-back control, when a pressure difference between the target pressure and the hydraulic pressure becomes large because of a control delay generated due to a structural nature of the device, a sudden change of the hydraulic pressure may occur. For example, when such control delay occurs while an operator of the vehicle is performing a soft or gentle brake operation, the braking force is suddenly outputted. This sudden output or sudden change of the braking force may lead to a deterioration of brake feeling, an occurrence of a noise or a shock. Particularly, when the brake operation is performed while the vehicle is running at a low speed, or when the brake operation is performed slowly or gently, the pressure difference between the target pressure and the current hydraulic pressure tends to become large, which may lead to the deterioration of brake feeling or the like.

Accordingly, this invention was made in consideration with the above-mentioned situation and the objective of the invention is to provide a vehicle brake device which can suppress a deterioration of brake feeling and/or an occurrence of a noise or a shock.

Solution to Problem(s)

The vehicle brake device according to the invention is characterized in that the vehicle brake device, in which a braking force is applied to a wheel of a vehicle in response to a hydraulic pressure of a brake fluid, includes a hydraulic pressure control portion which performs a feed-back control so that an actual hydraulic pressure of the brake fluid approximates an instruction target pressure and a target pressure setting portion which sets the instruction target pressure to a value in the actual hydraulic pressure side when a pressure deviation between an operating target pressure which is a target pressure of the brake fluid corresponding to a brake operation and the actual hydraulic pressure is larger than a first pressure difference and at the same time when the actual hydraulic pressure is approaching to the operating target pressure.

Effect of Invention

According to the invention, even when the pressure deviation between the operating target pressure and the actual hydraulic pressure becomes large under the feed-back control, the instruction target pressure is shifted to a value in the actual hydraulic pressure side, to thereby reduce the pressure difference between the instruction target pressure and the actual hydraulic pressure. Thus, a sudden change of the braking force to the wheel can be suppressed. In other words, according to the invention, even when a delay of a hydraulic pressure control occurs, a gentle or a gradual change of the braking force can be achieved to thereby suppress a deterioration of brake feeling and/or an occurrence of noise or shock.

BRIEF EXPLANATION OF ATTACHED DRAWINGS

EMBODIMENTS FOR IMPLEMENTING INVENTION

Figure 1:
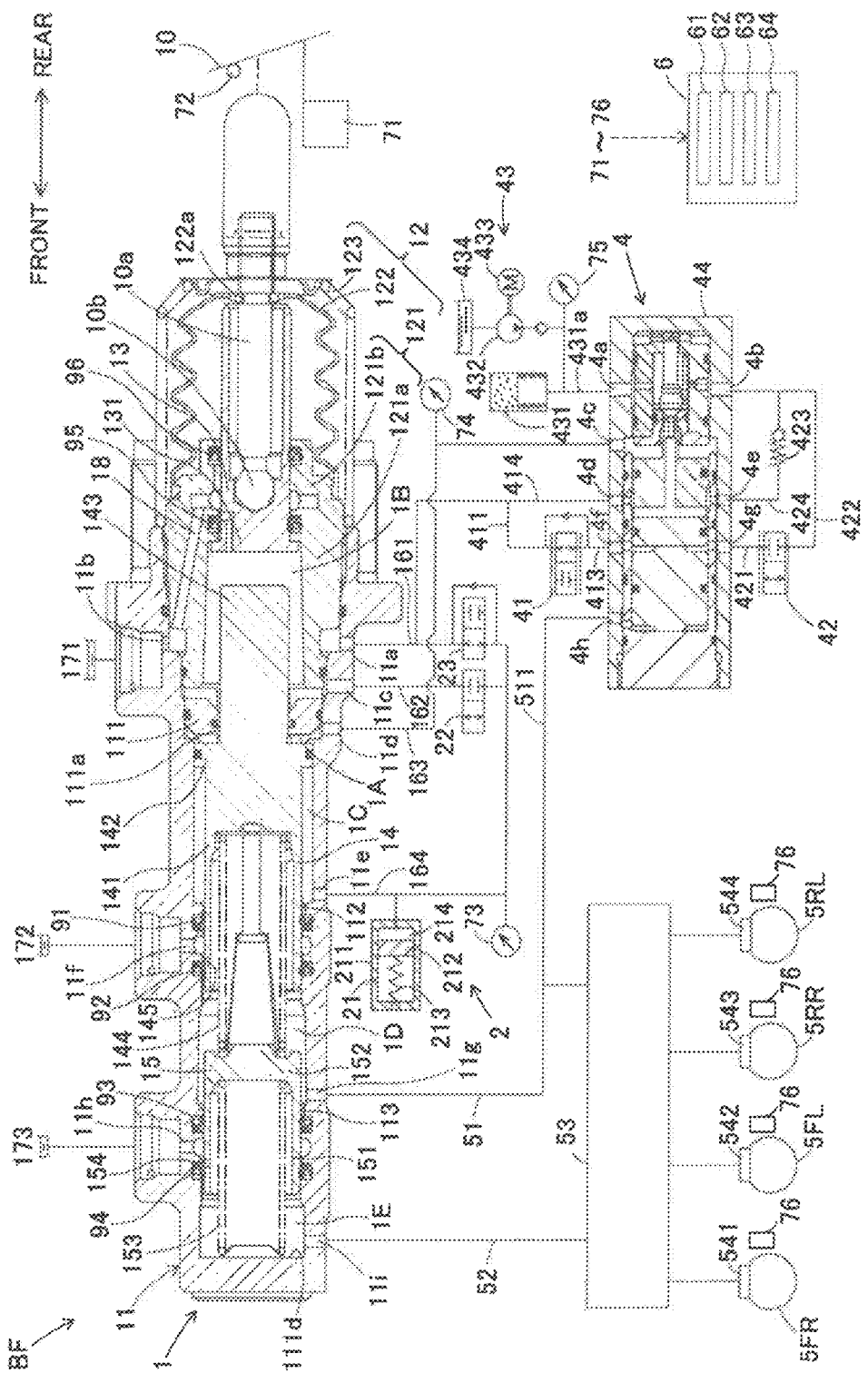
FIG. 1 is a structural view of the vehicle brake device according to an embodiment of the invention.

The embodiments of the invention will be explained hereinafter with reference to the attached drawings. It is noted that a portion in an embodiment, which is the same to or similar to a portion in different embodiments is referenced as the same symbol or the numeral throughout the drawings. Further, it is noted that each drawing used for explanation shows a conceptual drawing and the shape of each portion in the drawings does not necessarily indicate an accurate shape in practical use.

As shown in FIG. 1, the vehicle brake device according to the embodiment of the invention is formed by a hydraulic pressure braking force generating device BF which generates a hydraulic pressure braking force and applies the hydraulic pressure braking force to vehicle wheels 5FR, 5FL, 5RR and 5RL and a brake ECU 6 which controls the hydraulic pressure braking force generating device BF.

(Hydraulic Pressure Braking Force Generating Device)

The hydraulic pressure braking force generating device BF is formed by a master cylinder 1, a reaction force generating device 2, a first control valve 22, a second control valve 23, a servo pressure generating device 4, an actuator 53 wheel cylinders 541 through 544 and various sensors 71 through 76 and so on.

(Master Cylinder)

The master cylinder 1 is a portion which supplies the actuator 53 with an operating fluid (corresponding to a brake fluid of the invention) in response to the operating amount of a brake pedal 10 and is formed by a main cylinder 11, a cover cylinder 12, an input piston 13, a first master piston 14 and a second master piston 15 and so on. The brake pedal 10 may be of any type of brake operating means that can perform brake operation by a driver of the vehicle.

The main cylinder 11 is formed in a substantially bottomed cylinder shape housing having a bottom surface closed at a front end and an opening at a rear end thereof. The main cylinder 11 includes therein an inner wall portion 111, which extends inwardly with a shape of flange at a rear side in the inner peripheral side of the main cylinder 11. An inner circumferential surface of the inner wall portion 111 is provided with a through hole 111a at a central portion thereof, penetrating through the inner wall portion in front and rearward direction. The main cylinder 11 is provided therein at portions closer to the front end than the inner wall portion 111 with a small diameter portion 112 (rear) and a small diameter portion 113 (front), each of which inner diameter is set to be slightly smaller than the inner diameter of the inner wall portion 111. In other words, the small diameter portions 112, 113 project from the inner circumferential surface of the main cylinder 11 having an inwardly annularly shaped profile. The first master piston 14 is disposed inside the main cylinder 11 and is slidably movable along the small diameter portion 112 in the axial direction. Similarly, the second master piston 15 is disposed inside the main cylinder 11 and is slidably movable along the small diameter portion 113 in the axial direction.

The cover cylinder 12 includes an approximately cylindrical portion 121, a tubular bellow boots 122 and a cup-shaped compression spring 123. The cylindrical portion 121 is arranged at a rear end side of the main cylinder 11 and is coaxially fitted into the rear side opening of the main cylinder 11. An inner diameter of a front portion 121a of the cylindrical portion 121 is formed to be greater than an inner diameter of the through hole 111a of the inner wall portion 111. Further, the inner diameter of the rear portion 121b is formed to be smaller than the inner diameter of the front portion 121a.

The boots 122 is of tubular bellow shaped and is used for dust prevention purpose and is extendible or compressible in front and rearward directions. The front side of the boots 122 is assembled to be in contact with the rear end side opening of the cylindrical portion 121. A through hole 122a is formed at a central portion of the rear of the boots 122. The compression spring 123 is a coil shaped biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is a piston configured to slidably move inside the cover cylinder 12 in response to an operation of the brake pedal 10. The input piston 13 is formed in a substantially bottomed cylinder shape having a bottom surface at a front portion thereof and an opening at a rear portion thereof. A bottom wall 131 forming the bottom surface of the input piston 13 has a greater diameter than the diameters of the other parts of the input piston 13. The input piston 13 is arranged at the rear end portion 121b of the cylindrical potion 121 and is slidably and fluid-tightly movable in an axial direction and the bottom wall 131 is assembled into an inner peripheral side of the front portion 121a of the cylindrical portion 121.

The operating rod 10a operable in association with the brake pedal 10 is arranged inside of the input piston 13. A pivot 10b is provided at a tip end of the operating rod 10a so that the pivot 10b can push the input piston 13 toward front side. The rear end of the operating rod 10a projects towards outside through the rear side opening of the input piston 13 and the through hole 122a of the boots 122, and is connected to the brake pedal 10. The operating rod 10a moves in response to the depression operation of the brake pedal 10. More specifically, when the brake pedal 10 is depressed, the operating rod 10a advances in a forward direction, while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front and the cylindrical portion 141, the flange portion 142 and the projection portion 143 are formed integrally as a unit. The pressurizing cylindrical portion 141 is formed in a substantially bottomed cylinder shape having an opening at a front portion thereof and a bottom wall at a rear portion thereof. The pressurizing cylindrical portion 141 includes a clearance formed with the inner peripheral surface of the main cylinder 11 and is slidably in contact with the small diameter portion 112. A coil spring-shaped biasing member 144 is provided in the inner space of the pressurizing cylindrical portion 141 between the first master piston 14 and the second master piston 15. The first master piston 14 is biased in a rear direction by the biasing member 144. In other words, the first master piston 14 is biased by the biasing member 144 towards a predetermined initial position.

The flange portion 142 is formed to have a greater diameter than the diameter of the pressurizing cylindrical portion 141 and is slidably in contact with the inner peripheral surface of the main cylinder 11. The projection portion 143 is formed to have a smaller diameter than the diameter of the flange portion 142 and is slidably in fluid-tightly contact with the through hole 111a of the inner wall portion 111. The rear end of the projection portion 143 projects into an inner space of the cylindrical portion 121, passing through the through hole 111a and is separated from the inner peripheral surface of the cylindrical portion 121. The rear end surface of the projection portion 143 is separated from the bottom wall 131 of the input piston 13 and the separation distance is formed to be variable.

It is noted here that a "first master chamber 1D" is defined by the inner peripheral surface of the main cylinder 11, a front side (front end surface, inner peripheral surface) of the pressurizing cylindrical portion 141 of the first master piston 14 and a rear side of the second master piston 15. A rear chamber which is located further rearward of the first master chamber 1D, is defined by the inner peripheral surface (inner peripheral portion) of the main cylinder 11, the small diameter portion 112, a front surface of the inner wall portion 111 and the outer peripheral surface of the first master piston 14. The front-end portion and the rear end portion of the flange portion 142 of the first master piston 14 separate the rear chamber into a front portion and a rear portion and a "second hydraulic pressure chamber 10" is defined at the front side of the rear chamber and a "servo chamber (corresponding to the output chamber) 1A" is defined at the rear side of the rear chamber. Further, a "first hydraulic pressure chamber 1B" is defined by the inner peripheral portion of the main cylinder 11, a rear surface of the inner wall portion 111, an inner peripheral surface (inner peripheral portion) of the front portion 121a of the cylindrical portion 121, the projection portion 143 (rear end portion) of the first master piston 14 and the front end of the input piston 12.

The second master piston 15 is coaxially arranged within the main cylinder 11 at a location forward of the first master piston 14 and is slidably movable in an axial direction to be in slidable contact with the small diameter portion 113. The second master piston 15 is formed as a unit with a tubular pressurizing cylindrical portion 151 in a substantially bottomed cylinder shape having an opening at a front portion thereof and a bottom wall 152 which closes the rear end of the tubular pressurizing cylindrical portion 151. The bottom wall 152 supports the biasing member 144 with the first master piston 14. A coil spring-shaped biasing member 153 is disposed in the inner space of the pressurizing cylindrical portion 151 between the second piston 15 and a closed inner bottom surface 111d of the main cylinder 11. The second master piston 15 is biased by the biasing member 153 in a rearward direction. In other words, the second master piston 15 is biased by the biasing member 153 towards a predetermined initial position. A "second master chamber 1E" is defined by the inner peripheral surface of the main cylinder 11, the inner bottom surface 111d and the second master piston 15.

Ports 11a through 11i, which connect the inside and the outside of the master cylinder 1, are formed at the master cylinder 1. The port 11a is formed on the main cylinder 11 at a location rearward of the inner wall portion 111. The port 11b is formed on the main cylinder 11 opposite to the port 11a in the axial direction at approximately the same location. The port 11a and the port 11b are in communication through an annular space formed between the inner circumferential surface of the main cylinder 11 and the outer circumferential surface of the cylindrical portion 121. The port 11a and the port 11b are connected to a conduit 161 and also connected to a reservoir 171 (low pressure source).

The port 11b is in communication with the first hydraulic pressure chamber 1B via a passage 18 formed at the cylindrical portion 121 and the input piston 13. The fluid communication through the passage 18 is interrupted when the input piston 13 advances forward. In other words, when the input piston 13 advances forward, the fluid communication between the first hydraulic pressure chamber 1B and the reservoir 171 is interrupted.

The port 11c is formed at a location rearward of the inner wall portion 111 and forward of the port 11a and the port 11c connects the first hydraulic pressure chamber 1B with a conduit 162. The port 11d is formed at a location forward of the port 11c and connects the servo chamber 1A with a conduit 163. The port 11e is formed at a location forward of the port 11d and connects the second hydraulic pressure chamber 10 with a conduit 164.

The port 11f is formed between the sealing members 91 and 92 provided at the small diameter portion 112 and connects a reservoir 172 with the inside of the main cylinder 11. The port 11f is in communication with the first master chamber 1D via a passage 145 formed at the first master piston 14. The passage 145 is formed at a location where the port 11f and the first master chamber 1D are disconnected from each other when the first master piston 14 advances forward. The port 11g is formed at a location forward of the port 11f and connects the first master chamber 1D with a conduit 51.

The port 11h is formed between the sealing members 93 and 94 provided at the small diameter portion 113 and connects a reservoir 173 with the inside of the main cylinder 11. The port 11h is in communication with the second master chamber 1E via a passage 154 formed at the pressurizing cylindrical portion 151 of the second master piston 15. The passage 154 is formed at a location where the port 11h and the second master chamber 1E are disconnected from each other when the second master piston 15 advances forward. The port 11i is formed at a location forward of the port 11h and connects the second master chamber 1E with a conduit 52.

Sealing members, such as O-rings and the like (see black circles indicated in the drawings) are appropriately provided within the master cylinder 1. The sealing members 91 and 92 are provided at the small diameter portion 112 and are liquid-tightly in contact with the outer circumferential surface of the first master piston 14. Similarly, the sealing members 93 and 94 are provided at the small diameter portion 113 and are liquid-tightly in contact with the outer circumferential surface of the second master piston 15. Additionally, sealing members 95 and 96 are provided between the input piston 13 and the cylindrical portion 121.

The stroke sensor 71 is a sensor which detects the operating amount (stroke) of the brake pedal 10 operated by a driver of the vehicle and transmits the detected result to the brake ECU 6. The brake stop switch 72 is a switch which detects whether the brake pedal 10 is depressed or not, using a binary signal and the detected signal is sent to the brake ECU 6.

(Reaction Force Generating Device)

The reaction force generating device 2 is a device which generates a reaction force against the operation force generated when the brake pedal 10 is depressed. The reaction force generating device 2 is formed mainly by a stroke simulator 21. The stroke simulator 21 generates a reaction force hydraulic pressure in the first hydraulic pressure chamber 1B and the second hydraulic pressure chamber 1C in response to the operation of the brake pedal 10. The stroke simulator 21 is configured in such a manner that a piston 212 is fitted into a cylinder 211 while being allowed to slidably move therein. The piston 212 is biased in the rearward side direction by a compression spring 213 and a reaction force hydraulic pressure chamber 214 is formed at a location rearward side of the piston 212. The reaction force hydraulic pressure chamber 214 is connected to the second hydraulic pressure chamber 1C via a conduit 164 and the port 11e, and is connected further to the first control valve 22 and the second control valve 23 via the conduit 164.

(First Control Valve)

The first control valve 22 is an electromagnetic valve which is structured to close under non-energized state and opening and closing operations thereof are controlled by the brake ECU 6. The first control valve 22 is disposed between the conduit 164 and the conduit 162 for communication therebetween. The conduit 164 is connected to the second hydraulic pressure chamber 1C via the port 11e and the conduit 162 is connected to the first hydraulic pressure chamber 1B via the port 11c. The first hydraulic pressure chamber 1B becomes in open state when the first control valve 22 opens and becomes in closed state when the first control valve 22 closes. Accordingly, the conduits 164 and 162 are formed for establishing fluid communication between the first hydraulic pressure chamber 1B and the second hydraulic pressure chamber 10.

The first control valve 22 is closed under non-energized state where an electricity is not applied and under this state, communication between the first hydraulic pressure chamber 1B and the second hydraulic pressure chamber 10 is interrupted. Due to the closure of the first hydraulic pressure chamber 1B, the operating fluid is nowhere to flow and the input piston 13 and the first master piston 14 are moved integrally keeping a constant separation distance therebetween. The first control valve 22 is open under the energized state where an electricity is applied and under such state, the communication between the first hydraulic pressure chamber 1B and the second hydraulic pressure chamber 10 is established. Thus, the volume changes in the first hydraulic pressure chamber 1B and the second hydraulic pressure chamber 10 due to the advancement and retreatment of the first master piston 14 can be absorbed by the transferring of the operating fluid.

The pressure sensor 73 is a sensor which detects the reaction force hydraulic pressure of the second hydraulic pressure chamber 10 and the first hydraulic pressure chamber 1B and is connected to the conduit 164. The pressure sensor 73 detects the pressure of the second hydraulic pressure chamber 10 while the first control valve 22 is in a closed state and also detects the pressure of the first hydraulic pressure chamber 1B while the first control valve 22 is in an open state. The pressure sensor 73 sends the detected signal to the brake ECU 6.

(Second Control Valve)

The second control valve 23 is an electromagnetic valve which is structured to open under a non-energized state and the opening and closing operations thereof are controlled by the brake ECU 6. The second control valve 23 is disposed between the conduit 164 and the conduit 161 for establishing fluid communication therebetween. The conduit 164 is in communication with the second hydraulic pressure chamber 10 via the port 11e and the conduit 161 is in communication with the reservoir 171 via the port 11a. Accordingly, the second control valve 23 establishes the communication between the second hydraulic pressure chamber 10 and the reservoir 171 under the non-energized state thereby generating no reaction force hydraulic pressure but the second control valve 23 interrupts the communication therebetween under the energized state thereby generating the reaction force hydraulic pressure.

(Servo Pressure Generating Device)

The servo pressure generating device 4 is formed by a pressure decreasing valve 41, a pressure increasing valve 42, a pressure supplying portion 43 and a regulator 44 and so on. The pressure decreasing valve 41 is a valve structured to open under a non-energized state (normally open valve) and the flow-rate (or, the pressure) thereof is controlled by the brake ECU 6. One end of the pressure decreasing valve 41 is connected to the conduit 161 via the conduit 411 and the other end thereof is connected to the conduit 413. In other words, the one end of the pressure decreasing valve 41 is connected to the reservoir 171 (the low-pressure source) via the conduits 411 and 161 and ports 11a and 11b. When the pressure decreasing valve 41 closes, the pressure decreasing valve 41 prevents operating fluid from flowing out from first pilot chamber 4D to be described later. It is noted here that the conduit 411 may not necessarily be connected to the reservoir 171, but may be connected to a reservoir 434, instead, which will be explained later. In such alternative case, the reservoir 434 corresponds to the low-pressure source of the invention. Further, as another alternative, a reservoir common to both of the reservoir 171 and the reservoir 434 may be used.

The pressure increasing valve 42 is an electromagnetic valve structured to close under a non-energized state (normally closed valve) and the flow-rate (or pressure) thereof is controlled by the brake ECU 6. One end of the pressure increasing valve 42 is connected to the conduit 421 and the other end thereof is connected to the conduit 422.

Figure 2:
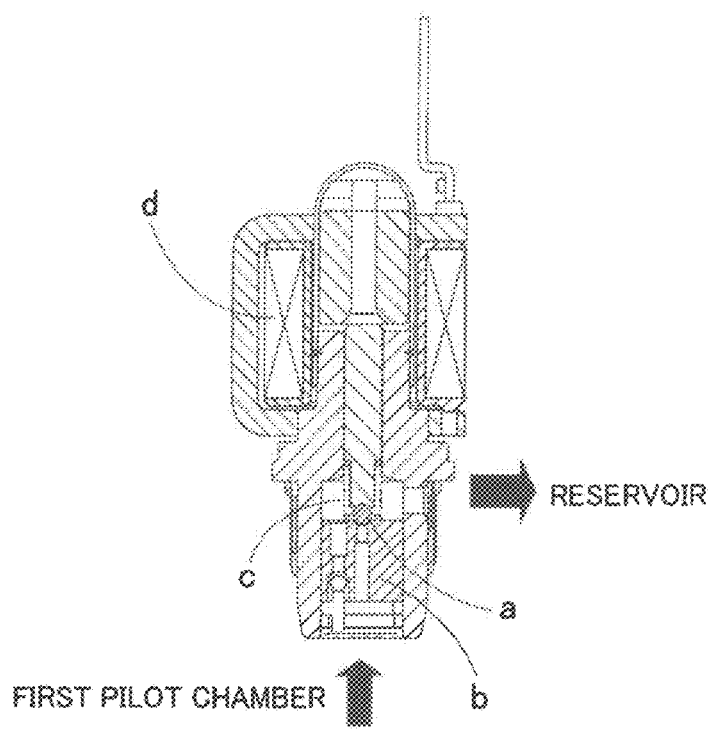
FIG. 2 is a conceptual view for explaining an example of an electromagnetic valve.

One example of a normally open type electromagnetic valve which is used for the pressure decreasing valve 41 will be schematically explained hereinafter. As shown in FIG. 2, the electromagnetic valve (pressure decreasing valve 41) is formed by a valve member "a", a valve seat "b", a spring "c" which biases the valve member "a" in a valve opening direction (in a direction where the valve member "a" is separated from the valve seat "b"), and a coil (solenoid) "d" which generates an electromagnetic driving force for pushing the valve member "a" in a valve closing direction when energized. When a current flowing through the coil "d" is less than a valve closing current, the valve member "a" and the valve seat "b" are separated from each other by the biasing force of the spring "c" and the electromagnetic valve is in a valve open state. However, when a current flowing through the coil "d" is equal to or more than the valve closing current, the valve member "a" is brought into contact with the valve seat "b" by the electromagnetic driving force, which is generated at the coil "d" to push the valve member "a" in the valve closing direction. The electromagnetic driving force becomes larger than the sum of the biasing force of the spring "c" and a pressure differential operation force generated by the pressure difference between an inlet side and an outlet side of the electromagnetic valve when the current flowing through the coil "d" is equal to or more than the valve closing current and the electromagnetic valve is closed. The value of the valve closing current (minimum control current which can close the valve) is decided by the pressure difference between the inlet side and the outlet side of the electromagnetic valve.

As explained, the opening and closing operations of the pressure decreasing valve 41 and the pressure increasing valve 42 are decided by a force balance among the electromagnetic driving force which is generated by the current flowing through the coil "d", the biasing force of the spring "c" and the pressure differential operation force generated by the pressure difference between the inlet side and the outlet side of the electromagnetic valve and are controlled by the current (control current) supplied to the coil "d". It is noted here that the direction of biasing force of the spring and the direction of the electromagnetic driving force are decided depending on the structure of the electromagnetic valve (normally open type or normally closed type and so on).

The pressure supplying portion 43 is a portion for supplying the regulator 44 mainly with a highly pressurized operating fluid. The pressure supplying portion 43 includes an accumulator 431 (the high-pressure source), a hydraulic pressure pump 432, a motor 433 and the reservoir 434 and so on.

The accumulator 431 is a tank in which a highly pressurized operating fluid is accumulated and is connected to the regulator 44 and the hydraulic pressure pump 432 via a conduit 431a. The hydraulic pressure pump 432 is driven by the motor 433 and supplies the operating fluid which has been reserved in the reservoir 434 to the accumulator 431. The pressure sensor 75 provided in the conduit 431a detects the accumulator hydraulic pressure in the accumulator 431 and sends the detected signal to the brake ECU 6. The accumulator hydraulic pressure correlates with the accumulated operating fluid amount accumulated in the accumulator 431.

When the pressure sensor 75 detects that the accumulator hydraulic pressure drops to a value equal to or lower than a predetermined value, the motor 433 is driven on the basis of a control signal from the brake ECU 6, and the hydraulic pressure pump 432 pumps the operating fluid to the accumulator 431 in order to recover a pressure up to the value equal to or more than the predetermined value.

Figure 3:
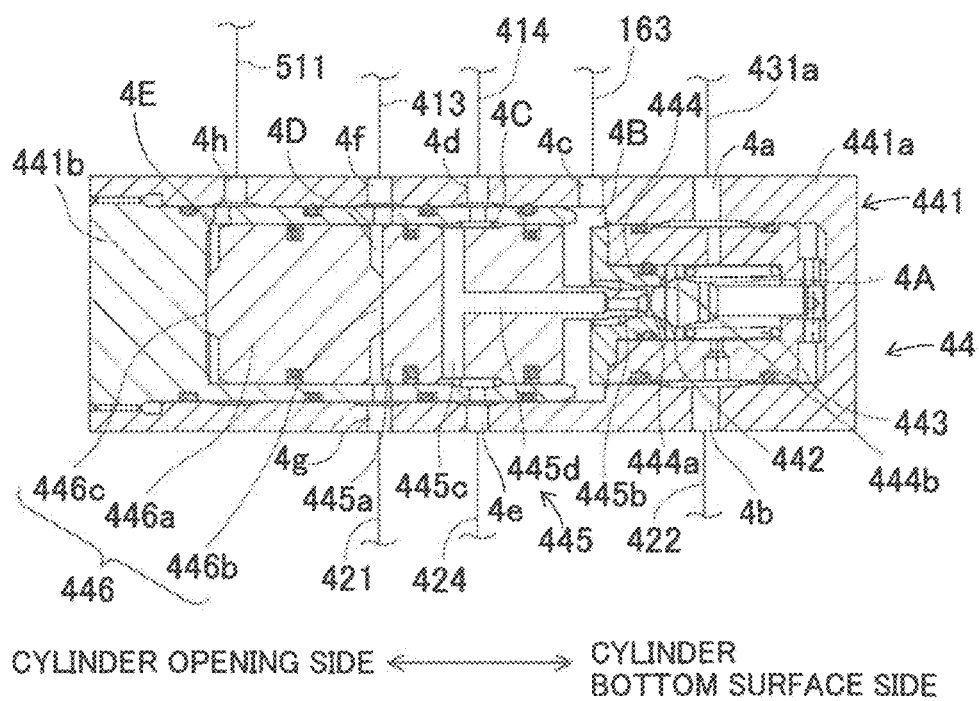
FIG. 3 is a cross sectional view of a regulator according to the embodiment.

The regulator 44 (the pressure adjusting device) includes a cylinder 441, a ball valve 442, a biasing portion 443, a valve seat portion 444, a control piston 445 and a sub-piston 446 and so forth as shown in FIG. 3.

The cylinder 441 includes a cylinder case 441a formed in a substantially bottomed cylinder-shape having a bottom surface at one end thereof (at the right side in FIG. 3) and a cover member 441b closing an opening of the cylinder case 441a (at the left side thereof in FIG. 3). It is noted here that the cylinder case 441a is provided with a plurality of ports 4a through 4h through which the inside and the outside of the cylinder case 441a are in communication. The cover member 441b is formed in a substantially bottomed cylinder-shape having a bottom surface and is provided with a plurality of ports which is arranged at positions facing to the respective cylindrical ports 4d through 4h provided on the cylinder 441.

The port 4a is connected to the conduit 431a. The port 4b is connected to the conduit 422. The port 4c is connected to a conduit 163. The conduit 163 connects the servo chamber 1A and the outlet port 4c. The port 4d is connected to the conduit 161 via the conduit 414. The port 4e is connected to the conduit 424 and further connected to the conduit 422 via a relief valve 423. The port 4f is connected to the conduit 413. The port 4g is connected to the conduit 421. The port 4h is connected to a conduit 511, which is branched from the conduit 51. It is noted here that the conduit 414 is connected to the conduit 161 in the embodiment, but it may be connected to the reservoir 434, instead of the conduit 161.

The ball valve 442 is a valve having a ball shape and is arranged at the bottom surface side (which will be hereinafter referred to also as a cylinder bottom surface side) of the cylinder case 441a inside the cylinder 441. The biasing portion 443 is formed by a spring member biasing the ball valve 442 towards the opening side (which will be hereinafter referred to also as a cylinder opening side) of the cylinder case 441a, and is provided at the bottom surface of the cylinder case 441a. The valve seat portion 444 is a wall member provided at the inner peripheral surface of the cylinder case 441a and divides the cylinder inside into two parts, the cylinder opening side and the cylinder bottom surface side. A through passage 444a, through which the cylinder opening side and the cylinder bottom surface side spaces are in communication, is formed at a central portion of the valve seat portion 444. The valve member 444 holds the ball valve 442 from the cylinder opening side in a manner that the biased ball valve 442 closes the through passage 444a. A valve seat surface 444b is formed at the opening of the cylinder bottom surface side of the through passage 444a and the ball valve 442 is detachably seated on (in contact with) the valve seat surface 444b.

A space defined by the ball valve 442, the biasing portion 443, the valve seat portion 444 and the inner circumferential surface of the cylinder case 441a at the cylinder bottom surface side is referred to as a "first chamber 4A". The first chamber 4A is filled with the operating fluid and is connected to the conduit 431a via the port 4a and to the conduit 422 via the port 4b.

The control piston 445 includes a main body portion 445a formed in a substantially columnar shape and a projection portion 445b formed in a substantially columnar shape having a diameter smaller than the diameter of the main body portion 445a. The main body portion 445a is arranged in the cylinder 441 in a coaxial and liquid-tight manner on the cylinder opening side of the valve seat portion 444, the main body portion 445a being slidably movable in an axial direction. The main body portion 445a is biased towards the cylinder opening side by means of a biasing member (not shown). A passage 445c is formed at a substantially intermediate portion of the main body portion 445a in a cylinder axis direction. The passage 445c extends in the radial direction (in an up-and-down direction as viewed in the drawing) and both ends of the passage 445c are open to the circumferential surface of the main body portion 445a. A portion of an inner circumferential surface of the cylinder 441 corresponding to an opening position of the passage 445c is provided with the port 4d and is recessively formed. The recessed space portion forms a "third chamber 4C".

The projection portion 445b projects towards the cylinder bottom surface side from a center portion of an end surface of the cylinder bottom surface side of the main body portion 445a. The projection portion 445b is formed so that the diameter thereof is smaller than the diameter of the through passage 444a of the valve seat portion 444. The projection portion 445b is coaxially provided relative to the through passage 444a. A tip end of the projection portion 445b is spaced apart from the ball valve 442 towards the cylinder opening side by a predetermined distance. A passage 445d is formed at the projection portion 445b so that the passage 445d extends in the cylinder axis direction and opens at a center portion of an end surface of the projection portion 445b. The passage 445d extends into the inside of the main body portion 445a and is connected to the passage 445c.

A space defined by the end surface of the cylinder bottom surface side of the main body portion 445a, an outer peripheral surface of the projection portion 445b, the inner circumferential surface of the cylinder 441, the valve seat portion 444 and the ball valve 442 is referred to as a "second chamber 4B". The second chamber 4B is in communication with the ports 4d and 4e via the passages 445d and 445c and the third chamber 4C.

The sub-piston 446 includes a sub main body portion 446a, a first projection portion 446b and a second projection portion 446c. The sub main body portion 446a is formed in a substantially columnar shape. The sub main body portion 446a is arranged within the cylinder 441 in a coaxial and liquid-tight manner on the cylinder opening side of the main body portion 445a. The sub main body portion 446a is slidably movable in the axial direction.

The first projection portion 446b is formed in a substantially columnar shape having a diameter smaller than the diameter of the sub main body portion 446a and projects from a center portion of an end surface of the cylinder bottom surface side of the sub main body portion 446a. The first projection portion 446b is in contact with the end surface of the cylinder bottom surface side of the sub main body portion 446a. The second projection portion 446c is formed in the same shape as the first projection portion 446b. The second projection portion 446c projects from a center portion of an end surface of the cylinder opening side of the sub main body portion 446a. The second projection portion 446c is in contact with the cover member 441b.

A space defined by the end surface of the cylinder bottom surface side of the sub main body portion 446a, an outer peripheral surface of the first projection portion 446b, an end surface of the cylinder opening side of the control piston 445 and the inner circumferential surface of the cylinder 441 is referred to as a "first pilot chamber 4D". The first pilot chamber 4D is in communication with the pressure decreasing valve 41 via the port 4f and the conduit 413 and is in fluid communication with the pressure increasing valve 42 via the port 4g and the conduit 421.

A space defined by the end surface of cylinder opening side of the sub main body portion 446a, an outer peripheral surface of the second projection portion 446c, the cover member 441b and the inner circumferential surface of the cylinder 441 is referred to as a "second pilot chamber 4E". The second pilot chamber 4E is in communication with the port 11g via the port 4h and the conduits 511 and 51. Each of the chambers 4A through 4E is filled with the operating fluid. The pressure sensor 74 is a sensor that detects the servo pressure to be supplied to the servo chamber 1A and is connected to the conduit 163. The pressure sensor 74 sends the detected signal to the brake ECU 6.

As explained, the regulator 44 includes the control piston 445 which is driven by the difference between the force corresponding to the pressure (referred to also as "pilot pressure") in the first pilot chamber 4D and the force corresponding to the servo pressure and the volume of the first pilot chamber 4D changes in response to the movement of the control piston 445 and the more the liquid flowing into or out of the first pilot chamber 4D increases, the more the amount of the movement of the control piston 445 from the reference point thereof increases under the equilibrium state that the force corresponding to the pilot pressure balances with the force corresponding to the servo pressure. Thus, the flowing amount of the liquid flowing into or out of the servo chamber 1A is structured to be increasing.

The regulator 44 is structured so that the more the flowing amount of the liquid flowing into the first pilot chamber 4D from the accumulator 431 increases, the larger the volume of the first pilot chamber 4D becomes and at the same time the more the flowing amount of the liquid flowing into the servo chamber 1A from the accumulator 431 increases and further, the more the flowing amount of the liquid flowing out from the first pilot chamber 4D into the reservoir 171 increases, the smaller the volume of the first pilot chamber 4D becomes and at the same time the more the flowing amount of the liquid flowing out of the servo chamber 1A into the reservoir 171 increases.

Further, the control piston 445 is provided with a damper device (not shown) at the wall portion facing to the first pilot chamber 4D. The damper device is structured as a stroke simulator and is provided with a piston portion which is biased towards the first pilot chamber 4D by a biasing member. By this provision of the damper device, the rigidity of the first pilot chamber 4D is variable in response to the pilot pressure.

(Actuator)

The first master chamber 1D and the second master chamber 1E which generate the master cylinder hydraulic pressure (master pressure) are connected to the wheel cylinders 541 through 544 via the conduits 51 and 52 and the actuator 53. The wheel cylinders 541 through 544 form a brake device for the vehicle wheels 5FR through 5RL. In more specifically, the port 11g of the first master chamber 1D and the port 11i of the second master chamber 1E are connected to the actuator 53 via the conduits 51 and 52 respectively. The actuator 53 is connected to the wheel cylinders 541 through 544 which are operated to perform brake operation for the wheels 5FR through 5RL.

The hydraulic pressure generating device BF includes a wheel speed sensor 76 which is equipped at each vehicle wheel to detect the wheel speed of the respective wheels. The detected signal which indicates the wheel speed (vehicle speed) detected by the wheel speed sensor 76 is outputted to the brake ECU 6.

In the actuator 53 structured above, the brake ECU 6 controls switching over operation of each holding valve and each pressure decreasing valve based on the master pressure, state of wheel speed and front/rear acceleration and by operating a motor, when necessary, executes an ABS control (Anti-lock braking control) by adjusting the brake hydraulic pressure to be applied to each wheel cylinder 541 through 544, i.e., braking force to be applied to each wheel 5FR through 5RL. The actuator 53 is a device which supplies the operating fluid supplied from the master cylinder 1 to the wheel cylinders 541 through 544 by adjusting the amount and the timing thereof based on the instructions from the brake ECU 6.

Under the "brake control" which will be explained later, when the hydraulic pressure pumped out from the accumulator 431 of the servo pressure generating device 4 is controlled by the pressure increasing valve 42 and the pressure decreasing valve 41, the servo pressure is generated in the servo chamber 1A. Then the first master piston 14 and the second master piston 15 advance forward to pressurize fluid in the first master chamber 1D and the second master chamber 1E by the generation of the servo pressure in the servo chamber 1A. The pressurized hydraulic fluid in the first master chamber 1D and the second master chamber 1E is supplied to the wheel cylinders 541 through 544 via the conduits 51 and 52 and the ABS 53 as the master pressure thereby applying hydraulic pressure braking force to the wheels 5FR through 5RL.

(Brake ECU 6)

The brake ECU 6 is an electronic control unit and includes a microcomputer. The microcomputer includes an input/output interface, CPU, RAM, ROM and a memory portion such as non-volatile memory, connected with one another through bus communication.

The brake ECU 6 is connected to the various sensors 71 through 76 for controlling each of the electromagnetic valves 22, 23, 41 and 42 and the motor 433 and so on. The operating amount (stroke amount) of brake pedal 10 operated by the operator of the vehicle is inputted to the brake ECU 6 from the stroke sensor 71, a detecting signal, which shows whether or not the operation of the brake pedal 10 by the operator of the vehicle is performed, is inputted to the brake ECU 6 from the brake stop switch 72, the reaction force hydraulic pressure of the second hydraulic pressure chamber 1C or the pressure (or the reaction force hydraulic pressure) of the first hydraulic pressure chamber 1B is inputted to the brake ECU 6 from the pressure sensor 73, the servo pressure supplied to the servo chamber 1A is inputted to the brake ECU 6 from the pressure sensor 74, the accumulator hydraulic pressure of the accumulator 431 is inputted to the brake ECU 6 from the pressure sensor 75 and each wheel speed of the respective vehicle wheels 5FR through 5RL is inputted to the brake ECU 6 from each of the wheel speed sensors 76. The pressure detected by the pressure sensor 73 corresponds to the operating force by the depression of brake pedal 10 (hereinafter referred to as pedal operating force).

(Brake Control)

The brake control operation (normal brake control) by the brake ECU 6 will be explained hereinafter. The brake control is a normal control of hydraulic pressure braking force. In other words, the brake ECU 6 energizes the first control valve 22 and opens the first control valve 22 and energizes the second control valve 23 and closes the second control valve 23. By this closing of the second control valve 23, the communication between the second hydraulic pressure chamber 1C and the reservoir 171 is interrupted and by the opening of the first control valve 22, the communication between the first hydraulic pressure chamber 1B and the second hydraulic pressure chamber 1C is established. Thus, the brake control is a mode for controlling the servo pressure of the servo chamber 1A by controlling the pressure decreasing and pressure increasing valves 41 and 42 under the first control valve 22 being opened and the second control valve 23 being closed. The pressure decreasing valve 41 and the pressure increasing valve 42 may be said to be a valve device which adjusts the flow-rate of the operating fluid which flows into or out of the first pilot chamber 4D. Under this brake control, the brake ECU 6 calculates a "required braking force" required by the driver of the vehicle based on the operating amount of the brake pedal 10 detected by the stroke sensor 71 (displacement amount of the input piston 13) or the operating force of the brake pedal 10. Then, based on the calculated required braking force, a target servo pressure (corresponding to the instruction target pressure of the invention) is set. The pressure decreasing valve 41 and the pressure increasing valve 42 are controlled so that the actual servo pressure (corresponding to the actual pressure of the invention), which is actually measured by the pressure sensor 74, approximates the target servo pressure. Under this normal brake control, "the operating target pressure" set in response to the brake operation is set as the target servo pressure. The servo pressure indicates the hydraulic pressure of the operating fluid (brake fluid pressure) in the servo chamber 1A.

In more detail, under the state that the brake pedal 10 is not depressed, the brake control becomes the state as explained above, i.e., the state that the ball valve 442 closes the through passage 444a of the valve seat portion 444. Under this state, the pressure decreasing valve 41 is in an open state and the pressure increasing valve 42 is in a closed state. In other words, the fluid communication between the first chamber 4A and the second chamber 4B is interrupted.

The second chamber 4B is in communication with the servo chamber 1A via the conduit 163 to keep the hydraulic pressures in the two chambers 4B and 1A being mutually in an equal level. The second chamber 4B is in communication with the third chamber 4C via the passages 445c and 445d of the control piston 445. Accordingly, the second chamber 4B and the third chamber 4C are in communication with the reservoir 171 via the conduits 414 and 161. One side of the pilot hydraulic pressure chamber 4D is closed by the pressure increasing valve 42, while the other side thereof is connected to the reservoir 171 via the pressure decreasing valve 41. The pressures of the first pilot chamber 4D and the second chamber 4B are kept to the same pressure level. The second pilot chamber 4E is in communication with the first master chamber 1D via the conduits 511 and 51 thereby keeping the pressure level of the two chambers 4E and 1D mutually to be equal to each other.

From this state, when the brake pedal 10 is depressed, the brake ECU 6 controls the pressure decreasing valve 41 and the pressure increasing valve 42 based on the target servo pressure. In other words, the brake ECU 6 controls the pressure decreasing valve 41 to close and controls the pressure increasing valve 42 to open.

When the pressure increasing valve 42 is opened, a communication between the accumulator 431 and the first pilot chamber 4D is established. When the pressure decreasing valve 41 is closed, a communication between the first pilot chamber 4D and the reservoir 171 is interrupted. The pressure in the first pilot chamber 4D can be raised by the highly pressurized operating fluid supplied from the accumulator 431. By this raising of the pressure in the first pilot chamber 4D, the control piston 445 slidably moves towards the cylinder bottom surface side. Then the tip end of the projecting portion 445b of the control piston 445 is brought into contact with the ball valve 442 to close the passage 445d by the ball valve 442. Thus, the fluid communication between the second chamber 4B and the reservoir 171 is interrupted.

By further slidable movement of the control piston 445 towards the cylinder bottom surface side, the ball valve 442 is pushed towards the cylinder bottom surface side by the projection portion 445b to thereby separate the ball valve 442 from the valve seat surface 444b. This will allow establishment of fluid communication between the first chamber 4A and the second chamber 4B through the through passage 444a of the valve seat portion 444. As the highly pressurized operating fluid is supplied to the first chamber 4A from the accumulator 431, the hydraulic pressure in the second chamber 4B is also increased by the communication therebetween. It is noted that the more the separated distance of the ball valve 442 from the valve seat surface 444b becomes large, the more the fluid passage for the operating fluid becomes large and accordingly, the hydraulic pressure in the fluid passage downstream of the ball valve 442 becomes high. In other words, the more the pressure in the first pilot chamber 4D (pilot pressure), the larger the moving distance of the control piston 445 becomes and the larger the separated distance of the ball valve 442 from the valve seat surface 444b becomes and accordingly, the hydraulic pressure in the second chamber 4B (servo pressure) becomes high.

The brake ECU 6 controls the fluid passage downstream of the pressure increasing valve 42 to become large and at the same time controls the fluid passage downstream of the pressure decreasing valve 41 to become small so that the larger the displacement amount of the input piston 13 (operating amount of the brake pedal 10) detected by the stroke sensor 71, the higher the pilot pressure in the first pilot chamber 4D becomes. In other words, the larger the displacement amount of the input piston 13 (operating amount of the brake pedal 10), the higher the pilot pressure becomes and accordingly, the higher the servo pressure becomes. The servo pressure can be obtained from the pressure sensor 74 and can be converted into the pilot pressure.

As the pressure increase of the second chamber 4B, the pressure in the servo chamber 1A which is in fluid communication with the second chamber 4B increases. By the pressure increase in the servo chamber 1A, the first master piston 14 advances forward and the pressure in the first master chamber 1D increases. Then the second master piston 15 advances forward also and the pressure in the second master chamber 1E increases. By the increase of the pressure in the first master chamber 1D, highly pressurized operating fluid is supplied to the actuator 53, which will be explained later, and the second pilot chamber 4E. The pressure in the second pilot chamber 4E increases, but since the pressure in the first pilot chamber 4D is also increased, the sub piston 446 does not move. Thus, the highly pressurized (master pressure) operating fluid is supplied to the actuator 53 and a friction brake is operated to control brake operation of the vehicle. The force advancing the first master piston 14 forward under the "brake control" corresponds to a force corresponding to the servo pressure.

When the brake operation is released, as opposite to the above, the pressure decreasing valve 41 is open and the pressure increasing valve 42 is closed to establish the fluid communication between the reservoir 171 and the first pilot chamber 4D. Then, the control piston 445 retreats and the vehicle returns to the state before depression of the brake pedal 10.

The normal brake control according to the embodiment is a feed-back control, wherein a target servo pressure is set in response to the brake pedal 10 operation and the stroke of the brake pedal 10 and the pressure increasing valve 42 ad the pressure decreasing valve 41 are controlled to adjust the pilot pressure so that the servo pressure approximates the target servo pressure. Under the normal brake control operation, the target servo pressure is predetermined based on the map or the like which is set in advance. As explained according to the embodiment, an electromagnetic valve, which valve opening current or the valve closing current is changed by the pressure difference between the inlet and outlet ports, is used for the pressure increasing valve and the pressure decreasing valve 41.

A predetermined dead zone is set for the target servo pressure by the brake ECU 6. The brake ECU 6 recognizes that the actual servo pressure has reached substantially to the target servo pressure when the actual servo pressure enters into the area of the dead zone upon hydraulic pressure control. By providing the dead zone, the hunting of the hydraulic pressure control can be more suppressed than in the case where the target servo pressure is set to one point.

The brake ECU 6 controls the actual servo pressure so that a deviation between the target servo pressure and the actual servo pressure falls within the area of the dead zone when such deviation is out of the area of the dead zone and the actual servo pressure is held to the present level when the deviation between the target servo pressure and the actual servo pressure is within the area of the dead zone, upon brake control. The brake ECU 6 performs the feed-back control which controls the pressure decreasing valve 41 and the pressure increasing valve 42, watching the value of the pressure detected at the pressure sensor 74.

The brake ECU 6 controls the actual servo pressure to increase towards the target servo pressure when the actual servo pressure is out of the area of the dead zone and at the same time the actual servo pressure is smaller than the target servo pressure ("pressure increasing mode"). Further, the brake ECU 6 controls the actual servo pressure to decrease towards the target servo pressure when the actual servo pressure is out of the area of the dead zone and at the same time the actual servo pressure is larger than the target servo pressure ("pressure decreasing mode"). The brake ECU 6 controls the actual servo pressure to be held when the actual servo pressure falls within the area of the dead zone ("pressure holding mode"). For example, the brake ECU 6 opens the pressure increasing valve 42 and closes the pressure decreasing valve 41 under the pressure increasing mode and the brake ECU 6 closes the pressure increasing valve 42 and opens the pressure decreasing valve 41 under the pressure decreasing mode and closes both the pressure increasing valve 42 and the pressure decreasing valve 41 under the pressure holding mode.

(Feeling Deterioration Suppression Control)

The brake ECU 6 executes the feeling deterioration suppression control under a particular condition in addition to the normal brake control as explained above. One example of the feeling deterioration suppression control will be explained hereinafter. The brake ECU 6 includes a hydraulic pressure control portion 61, a target pressure setting portion 62, a limiting portion 63 and a limit setting portion 64, as functions. The hydraulic pressure control portion 61 executes a feed-back control which approximate the actual servo pressure to the target servo pressure based on the target servo pressure set at the target pressure setting portion 62. The hydraulic pressure control portion 61 transmits instructions to each portion of a control object. The actual servo pressure is obtained from the detected value of the pressure sensor 74. It is noted here that the target servo pressure is defined to be the final target pressure at a particular time, set by the brake ECU 6 (target pressure setting portion 62). On the other hand, the operating target pressure is the target pressure set in response to the brake operation. The operating target pressure is decided, for example, in response to the operation of the brake pedal 10 (detected value of the stroke sensor 71) and the pedal operating force based on the map or the like which has been memorized in advance. Under the normal brake control as explained above, the target servo pressure is set to the operating target pressure.

The target pressure setting portion 62 sets the operating target pressure to the target pressure so that the normal brake control may be executed, when a deviation (also referred to as a "control deviation") between the operating target pressure and the actual servo pressure is equal to or less than a first pressure difference and/or when the actual servo pressure is not approaching to the operating target pressure. Also, the target pressure setting portion 62 sets the target servo pressure to a value closer to the actual servo pressure side than the operating target pressure, when the control deviation is larger than the first pressure difference and at the same time when the actual servo pressure is approaching to the operating target pressure.

More specifically, the target pressure setting portion 62 according to the embodiment sets the change of operating target pressure or the change correlating with the change of operating target pressure from a time turning back by a certain turning back time (corresponding to a "first time"), (a delay time), starting from the time when the actual servo pressure starts changing to approximate the operating target pressure, as a starting time point, as the change of the target servo pressure from the time when the actual servo pressure starts changing to approximate the operating target pressure. In other words, the target pressure setting portion 62 sets the tuning back time and sets the target servo pressure so that the hydraulic pressure gradient of the target servo pressure from the current time point agrees to the hydraulic pressure gradient of the operating target pressure at the time turning back time before. As explained, the target pressure setting portion 62 sets the hydraulic pressure gradient of the target servo pressure to the hydraulic pressure gradient of the operating target pressure at the time turning back time before.

The control deviation becomes large as the time elapses when the state of the brake operation is changed, as long as the actual servo pressure is not changed. The operating target pressure the turning back time before is a value closer to the actual servo pressure than the operating target pressure at the current time when the time has elapsed. In other words, the target pressure setting portion 62 sets the target servo pressure closer to the actual servo pressure side than the operating target pressure at the current time by setting the target servo pressure as the operating target pressure the turning back time before when a certain condition is satisfied. Further, the target pressure setting portion 62 sets the operating target pressure to the target servo pressure (returning to the normal brake control) when the difference between the operating target pressure at the current time and the operating target pressure the turning back time before is equal to or less than a predetermined turning back time end threshold value (corresponding to "a second pressure difference").

According to the embodiment of the invention, the target pressure setting portion 62 judges whether or not the control deviation is greater than the first pressure difference, based on the hydraulic pressure gradient of the operating target pressure and the time from the time when the hydraulic pressure gradient thereof is set to the time when the actual servo pressure responds thereto. Thus, the target pressure setting portion 62 can relatively easily execute the comparison between the control deviation and the first pressure difference. It is noted that the method for judging the difference between the control deviation and the first pressure difference is not limited to the method according to the embodiment and any other method may be applicable, such as for example, the target pressure setting portion 62 may apply the method for actually comparing the operating target pressure and the actual servo pressure (detected value of the pressure sensor 74) in a randomly selected interval, thereby comparing the resulted difference therebetween and the first pressure difference.

The limiting portion 63 limits the turning back time set at the target pressure setting portion 62 to equal to or less than the maximum turning back time (corresponding to the "second time") set at the limit setting portion 64. The limit setting portion 64 sets the maximum turning back time such that the lower the vehicle speed, the longer the maximum turning back time becomes. Further, the limit setting portion 64 sets the maximum turning back time such that the larger the control deviation between the target servo pressure and the actual servo pressure when the target servo pressure is approximated closer to the actual servo pressure side than the operating target pressure, the shorter the maximum turning back time becomes. The feeling deterioration suppression control according to the embodiment is formed by "a turning back time setting processing" and "a target pressure delay control". The target pressure delay control, which will be explained later in detail, is a brake control executed based on the operating target pressure at the time turning back time by a certain time set at the turning back time setting processing. Accordingly, the target pressure delay control may be said to be a brake control executed based on the past operating target pressure.

Figure 4:
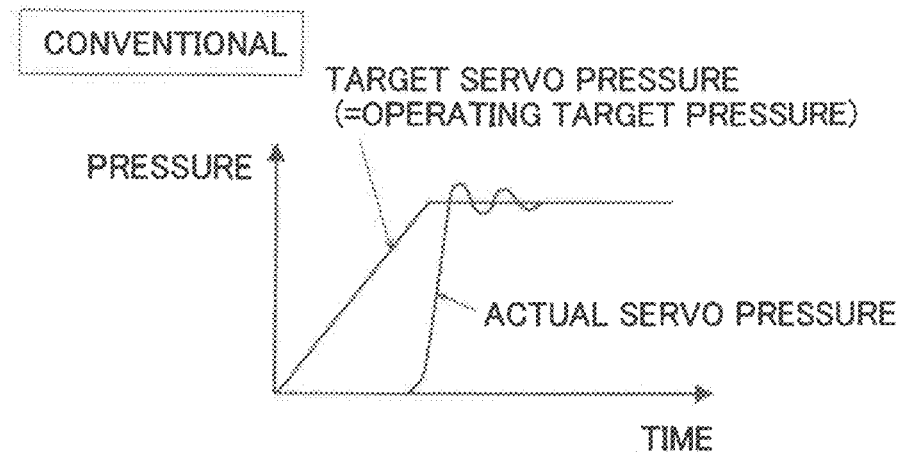
FIG. 4 is an explanatory view for explaining a hydraulic pressure change when a hydraulic pressure control is delayed according to a conventional control method.
Figure 5:
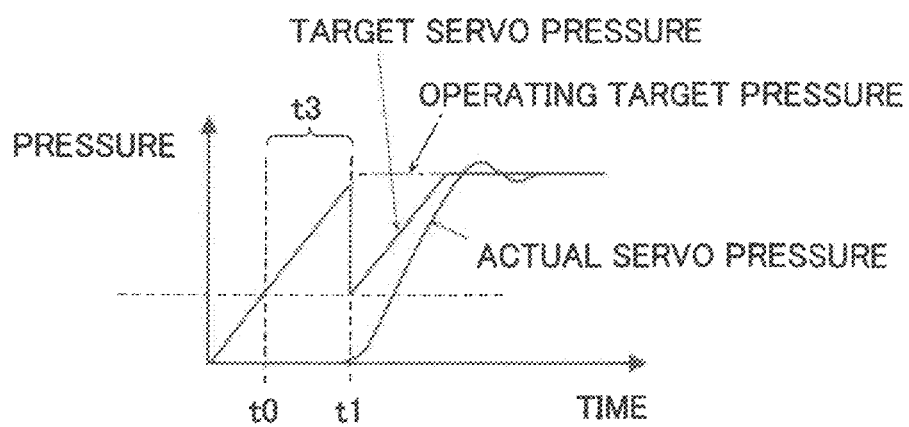
FIG. 5 is an explanatory view for explaining a hydraulic pressure change when a target pressure delay control according to the embodiment of the invention is executed.
Figure 6:
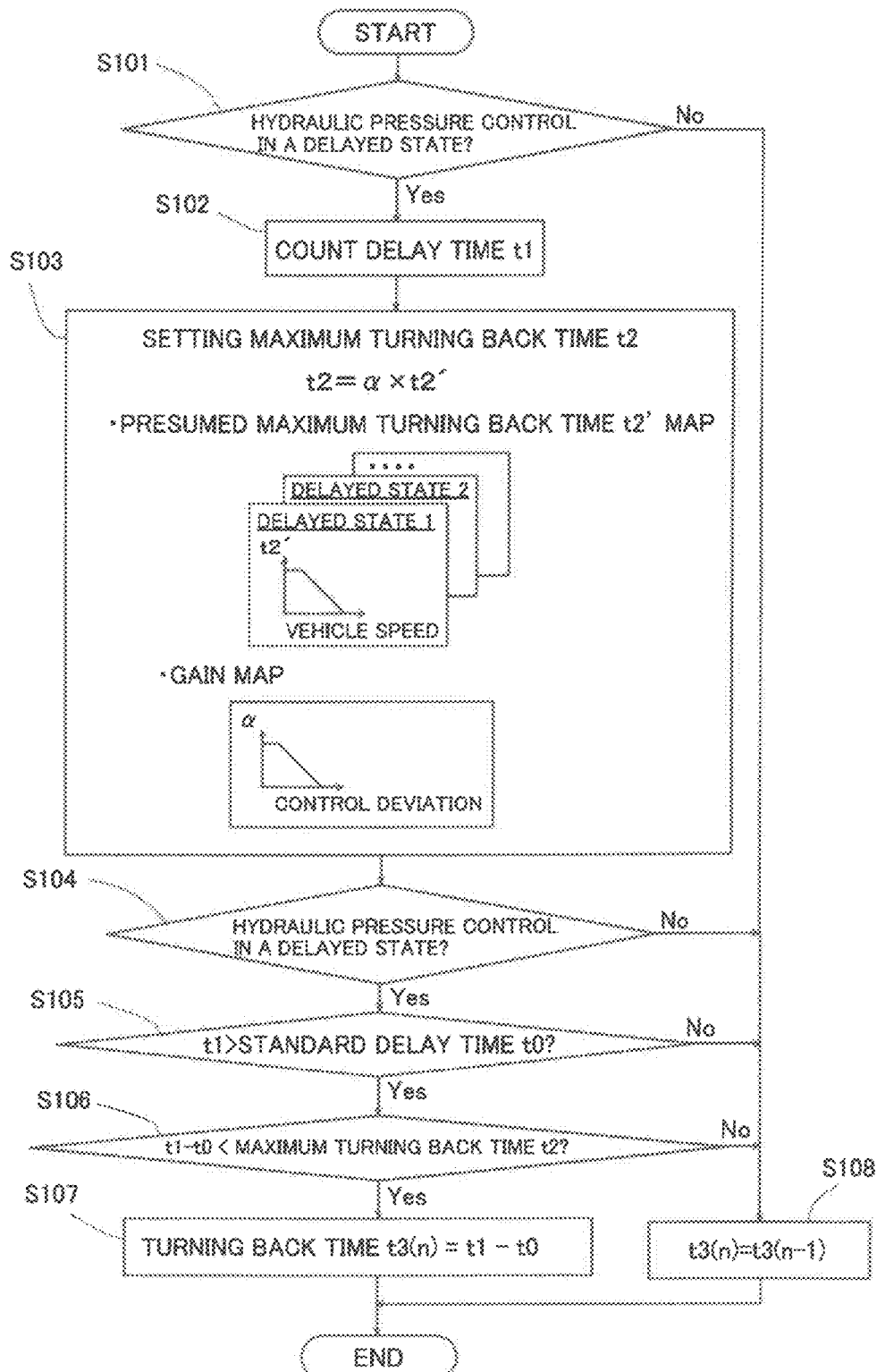
FIG. 6 is a flowchart for explaining a turning back time setting processing according to the embodiment of the invention.

The turning back time setting processing by the brake ECU 6 will be explained with reference to FIGS. 4 through 6. As shown in FIG. 6, the target pressure setting portion 62 first judges whether or not the hydraulic pressure control is in a delayed state (S101). The state that the pressure control is delayed indicates, for example, the state that the brake control has started, or the state that the control mode has been changed (brake operation has been changed). In other words, the target pressure setting portion 62 judges whether or not the current state is the state that the brake control has been started or the state that the control mode has been changed.

In the regulator 44, the control piston 445 has an idle area (ineffective stroke area) and accordingly, a response delay occurs between the driving operation of the control piston 445 and the opening and closing operation of the ball valve 442. This delay appears as the delay of hydraulic pressure control. One example of such delay state is the state wherein when the brake operation starts (brake control starts), the control piston 445 is driven. However, for a while, the control piston 445 moves merely to close the idle area. While the piston 445 closes the idle area, the actual servo pressure does not change. As explained, according to the vehicle brake device equipped with the regulator 44 has an area where no control hydraulic pressure responding to the electromagnetic valve output (instructions) is generated. Therefore, a control deviation (delay time) may easily extend during the operation in this area. The operation delay in the area includes a normal delay time which is calculated (presumed) in advance. The brake ECU 6 memorizes in advance a relationship between the "hydraulic pressure control delay time" generated at a normal (ideal) control and the "hydraulic pressure gradient of the operating target pressure". In other words, when the hydraulic pressure gradient of the operating target pressure is set in response to the brake operation, a standard delay time t0 which corresponds to the hydraulic pressure gradient of the operating target pressure can be calculated.

The flow of control will be explained by an example of the case that the brake operation has been started (See FIG. 5). As shown in FIG. 6, when the hydraulic pressure control is not in a delayed state (S101: No), the turning back time setting processing ends. When the hydraulic pressure control is in a delayed state (S101: Yes), the target pressure setting portion 62 counts the delay time t1 (S102). The delay time t1 is defined to be the time from the time when the hydraulic pressure control is judged to be in a delayed state (here, from the time when he brake control starts) to the time when the actual servo pressure responds (from the time when the actual servo pressure starts approaching to the target servo pressure). Then, the limit setting portion 64 sets the maximum turning back time t2 which is the upper limit of the turning back time t3 to be set later (S103). The limit setting portion 64 sets the maximum turning back time t2 from the vehicle speed and the control deviation based on the information (map or the like) in which the turning back time t2 is set such that the lower the vehicle speed, the longer the maximum turning back time t2 becomes and based on the information (map or the like) in which the turning back time t2 is set such that the larger the control deviation, the shorter the maximum turning back time t2 becomes.

In detail, the limit setting portion 64 according to the embodiment memorizes in advance the relationship between the "vehicle speed" and the "presumed maximum turning back time t2" under each state that the hydraulic pressure control delays. The relationship between the vehicle speed and the presumed maximum turning back time t2' is set such that the lower the vehicle speed, the longer the presumed maximum turning back time t2' becomes. Such relationship is set linearly or stepwise or by the combination of linearly and stepwise. The limit setting portion 64 sets the presumed maximum turning back time t2' based on the vehicle speed (detected value of each vehicle wheel speed sensor 76) when the hydraulic pressure control is judged to be in a delayed state.

Further, the limit setting portion 64 decides the gain "a" from the control deviation upon execution of the target pressure delay control based on the gain map which sets the relationship between the deviation (i.e., control deviation) between the operating target pressure and the actual servo pressure and the gain α upon execution of the target pressure delay control. The gain map sets the gain α such that the larger the control deviation, the smaller the gain becomes. Such relationship is set, for example, linearly or stepwise or by the combination thereof. The limit setting portion 64 decides the maximum turning back time t2 by multiplying the presumed maximum turning back time t2' by gain α. (t2=α×t2').

Then, the target pressure setting portion 62 judges whether or not the hydraulic pressure control is in a delayed state (S104). When the hydraulic pressure control is judged to be in a delayed state (S104: Yes), the target pressure setting portion 62 judges whether or not the currently counting delay time t1 is longer than the standard delay time t0 (S105). The control deviation at the standard delay time t0 corresponds to the "first pressure difference". In this way, whether or not the control deviation is larger than the first pressure difference is judged at the step S105.

When the delay time t1 is judged to be longer than the standard delay time to (S105: Yes), the limiting portion 63 judges whether or not the difference in time between the delay time t1 and the standard delay time t0 is smaller than the maximum turning back time t2 (or is equal to or less than the maximum turning back time t2) (S106). When the difference in time between the delay time t1 and the standard delay time t0 is judged to be smaller than the maximum turning back time t2 (S106: Yes), the target pressure setting portion 62 sets the difference in time between the delay time t1 and the standard delay time t0 as the turning back time t3 (*n*), wherein "n" represents a natural number. (S107). On the other hand, when the hydraulic pressure control is judged to be "not in the delayed state" (S104: No), or when the delay time t1 is judged to be equal to or less than the standard delay time t0 (S105: No), or when the difference in time between the delay time t1 and the standard delay time t0 is judged to be larger than the maximum turning back time t2 (S106: No), the target pressure setting portion 62 sets the previous time turning back time t3 (n−1) as the this time turning back time t3 (*n*) (S108). It is noted that according to the embodiment, when the turning back time is set first time (i.e., n=1), the turning back time is set to be zero (0) at the step S108.

Figure 7:
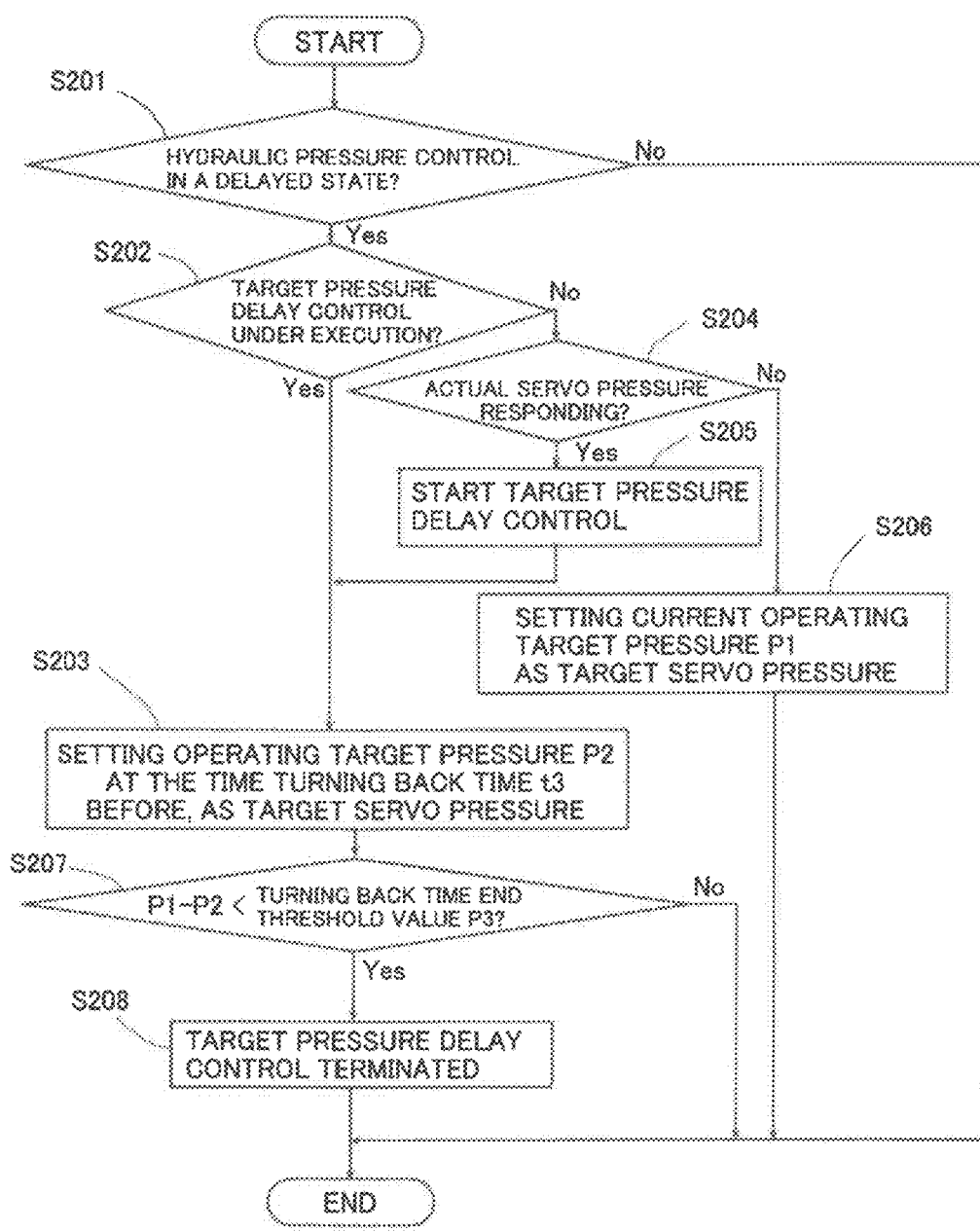
FIG. 7 is a flowchart for explaining a target pressure delay control according to the embodiment of the invention.

Next, the target pressure delay control will be explained with reference to FIGS. 4, 5 and 7. As shown in FIG. 7, the target pressure setting portion 62 judges whether or not the hydraulic pressure control is in a delayed state. (S201). When the hydraulic pressure control is judged to be not in a delayed state (S201: No), the control flow ends. When the hydraulic pressure control is judged to be in a delayed state (S201: Yes), the target pressure setting portion 62 judges whether the current state is already in a target pressure delay control state or not. (S202). When the state is judged to be in the target pressure delay control state, (S202: Yes), the target pressure setting portion 62 sets the operating target pressure P2 turning back the time by the time t3 set at the above explained processing as the target servo pressure (S203). The brake ECU 6 (hydraulic pressure control portion 61) controls the servo pressure generating device 4 based on the target servo pressure (P2) set at the step S203, not based on the current operating target pressure P1.

On the other hand, when the target pressure delay control is judged to be not in progress (S202: No), the brake ECU 6 judges whether or not the actual servo pressure responds. (S204). In other words, the brake ECU 6 judges whether or not the actual servo pressure is approaching to the operating target pressure. When the actual servo pressure does not respond (S204: No), the target pressure setting portion 62 sets the current operating target pressure P1 as the target servo pressure (S206) and the control flow ends. When the actual servo pressure responds (S204: Yes), the target pressure setting portion 62 starts target pressure delay control (S205) and sets the operating target pressure P2 set turning back the time by the turning back time t3 as the target servo pressure (S203). For the turning back time t3, the value at the execution of the target pressure delay control is used and during the target pressure delay control, the same turning back time t3 is set and accordingly, the target servo pressure during the target servo pressure delay control is set to have the hydraulic pressure gradient which is analogous to the hydraulic pressure gradient of the operating target pressure at the time the turning back time t3 before.

Then the target pressure setting portion 62 judges whether or not the pressure difference between the current operating target pressure P1 and the operating target pressure P2 at the time the turning back time t3 before is smaller than a predetermined turning back end threshold value. (S207). When the difference between the current operating target pressure P1 and the operating target pressure P2 at the time the turning back time t3 before is judged to be smaller than the predetermined turning back end threshold value. (S207: Yes), the target pressure setting portion 62 terminates the target pressure delay control (S208). In other words, when the pressure difference between the operating target pressure P1 and the operating target pressure P2 is smaller than the turning back end threshold value P3 (or P1−P2≤P3), the operating target pressure P1 is set as the target servo pressure.

(Operation and Effect)

According to the vehicle brake control device of the embodiment, the target servo pressure is shifted to an actual servo pressure side even when the control deviation becomes great under the feed-back control. Therefore, the pressure difference between the target servo pressure and the actual servo pressure becomes small to suppress a sudden braking force change. In other words, according to the vehicle brake control device of the embodiment, a gradual braking force change can be performed even when the control delay occurs and a deterioration of brake feeling, a noise generation or a generation of a shock can be suppressed. Further, in the embodiment, upon shifting the target servo pressure to an actual servo pressure side, the target servo pressure is set based on the operating target pressure at the time a turning back time before at the start of control or after the change of control. Thus, a response of brake operation at a normal operation (for example, an ideal response) can be easily reproduced. Particularly, according to the embodiment, since the turning back time is decided based on the time difference between the delay time and the standard or reference delay time, the change (response) of the actual servo pressure becomes the same as the response upon the standard delay time. Therefore, even when a delay in hydraulic pressure control occurs, a feeling at the normal brake operation can be reproduced. According to the embodiment, by adopting the target servo pressure of the past as the current target servo pressure, the hydraulic pressure gradient analogous to the gradient of the past can be reproduced as the gradient of the current time. The brake feeling can be given to the driver of the vehicle properly reflecting the brake operation by the driver, by controlling the control deviation.

According to the embodiment, the timing for executing the feeling deterioration suppression control (target pressure delay control) is limited to the time when the hydraulic pressure control is in a delayed state. Therefore, the feeling deterioration can be suppressed in more appropriate timing. Further, when the control deviation is equal to or less than the first pressure difference, a normal brake operation is performed and normal control amount is applied to accelerate early hydraulic pressure response. Further, according to the embodiment, since the maximum turning back time is set, even in a case where the delay time becomes greater than the maximum turning back time, the turning back time would not exceed the time longer than the maximum turning back time. In other words, according to the structure of the embodiment, during the target pressure delay control, the hydraulic pressure response delay is limited to a predetermined delay time and no further delay is generated. Accordingly, when the delay time becomes greater than an expected time, then the priority is given to the braking stability (assure the necessary hydraulic pressure) rather than suppressing the brake feeling.

It is noted that the feeling deterioration or the like due to the generation of the delay time tends to occur when the vehicle is running at a low speed (for example at about 5 to 10 km/h). In this embodiment, the maximum turning back time is decided in response to the vehicle speed. In more detail, the lower the vehicle speed, the longer the maximum turning back time is set to effectively suppress the deterioration of brake feeling at a low vehicle speed. On the other hand, the turning back time can be changed in response to the control deviation under the actual servo pressure being responding. In more detail, the maximum turning back time is set based on the gain map such that under the actual servo pressure responding operation, the larger the control deviation, the smaller the maximum turning back time becomes. Accordingly, when the control deviation becomes large due to, for example, a sudden brake operation, the gain value a becomes zero (0) or approaching to zero (0) to assure the braking force in an early timing.

Further, according to the embodiment, when the pressure difference between the target servo pressure and the current operating target pressure under the execution of the target pressure delay control is equal to or less than the turning back end threshold value, normal brake operation is executed instead executing the target pressure delay control. The turning back end threshold value is set to equal to or more than zero. (in FIG. 5, the value is set to zero). Thus, the target pressure delay control can be terminated in an appropriate timing.

The target pressure setting portion 62 approximates the target servo pressure to the pressure in further actual servo pressure side, by setting the turning back time t3 such that the larger the control deviation, the longer the turning back time t3 becomes upon the target pressure delay control. Therefore, when the time relationship "t1>t0" between t1 and t0 is established, even the time t1 becomes longer, the feeling deterioration can be appropriately suppressed as same as the case where the time t1 is short. Thus, the target pressure setting portion 62 may be configured to set the turning back time t3 in response to the control deviation. On the other hand, since the maximum turning back time t2 becomes smaller as the control deviation becomes small, the braking force can be appropriately assured.

Modified Embodiment

The present invention is not limited to the structure of the embodiment explained above. For example, the shifting amount (turning back time) of the target servo pressure may be changed in response to the brake operation speed. In more detail, the target pressure setting portion 62 may be configured to set the target servo pressure such that the lower the brake operation speed, the closer the target servo pressure is set to the servo pressure side. In other words, under the target pressure delay control, the lower the brake operation speed, the longer the turning back time becomes and higher the brake operation speed, the shorter the turning back time becomes. Accordingly, when a gradual brake operation is performed (when the brake pedal 10 is depressed gradually or slowly), the control that the feeling deterioration is suppressed can be executed and when a sudden brake operation is performed (when the brake pedal 10 is depressed suddenly or quickly), the braking force can be generated in an early stage of operation. The brake operation speed can be calculated by the brake ECU 6, for example, based on the detected value of the stroke sensor 71. Regarding to the structure of the regulator 44, instead of using the ball valve 442 for valve opening and closing operation according to the embodiment, a spool valve structure (for example, spool and sleeve structure) may be used for valve opening and closing operation. The "hydraulic pressure control is in a delayed state" occurs easily when the regulator 44 which establishes or interrupts the external communication by the movement of the spool valve is used, rather than the regulator with ball valve and the effect of the feeling deterioration suppression can be apparently improved. The feeling deterioration suppression control is not limited to the target pressure delay control and any control may be used, as far as such control performs that the target servo pressure approximates the actual servo pressure under the execution of the feeling deterioration suppression control. Further, the setting of the target servo pressure in the target pressure delay control is not limited to the setting based on the change per se of the operating target pressure a turning back time before and the setting may be based on the change correlating with the change of the operating target pressure the turning back time before. Further, the control object may not be limited to the actual servo pressure and another pressure (such as for example, actual master pressure or the actual wheel pressure) may be applicable as the control object.

SUMMARY

The present invention may be described as follows. The vehicle brake device according to the invention applies braking force to the wheel of the vehicle based on the hydraulic pressure of the brake fluid and includes a hydraulic pressure control portion 61 which performs a feed-back control in which the actual hydraulic pressure of the brake fluid approximates an instruction target pressure and a target pressure setting portion 62 which sets the instruction target pressure to an actual pressure side closer than the operating target pressure, when a pressure deviation between the operating target pressure corresponding to a target pressure of the hydraulic pressure of the brake fluid set in response to a brake operation, and the actual pressure is larger than a first pressure difference and at the same time when the actual pressure is approaching to the operating target pressure. The target pressure setting portion 62 may set the instruction target pressure to the actual pressure side further closer than the operating target pressure as larger the pressure deviation between the operating target pressure and the actual pressure becomes when the instruction target pressure is approximated to the actual pressure side closer than the operating target pressure. Further, the target pressure setting portion 62 sets the instruction target pressure such that the lower the brake operation speed, the closer the actual pressure side the instruction target pressure is set to.

The target pressure setting portion 62 may set the "change of the operating target pressure P2" or the "change correlating with the change of the operating target pressure P2" from the time t0 that is the time turning back the time by the first time t3, starting from the time t1 as a starting time point when the change that the actual pressure approximates the instruction target pressure starts as the "change of the instruction target pressure" from the time t1 when the change that the actual pressure approximates the instruction target pressure starts. Further, the target pressure setting portion 62 may set the operating target pressure as the instruction target pressure when the pressure deviation between the hydraulic pressure value (P2) of the instruction target pressure in the case where the change of the operating target pressure P2 or the change correlating with the change of operating target pressure P2 turning back time by the first time t3 from the time to, starting from the time t1 as a starting time when the change that the actual pressure approximates the instruction target pressure starts is defined to be the change of the instruction target pressure from the time t1 when the change that the actual pressure approximates the instruction target pressure starts, and the operating target pressure (P1) is equal to or less than a second pressure difference.

Further, the vehicle brake device may include the limiting portion 63 which limits the first time to equal to or less than the second time and the limit setting portion 64 which sets the second time such that the lower the vehicle speed, the longer the second time becomes. Further, the vehicle brake device may include the limiting portion 63 which limits the first time to equal to or less than the second time and the limit setting portion 64 which sets the second time such that the larger the pressure deviation between the operating target pressure and the actual pressure when the instruction target pressure approximates the actual pressure side closer than the operating target pressure, the shorter the second time becomes. Further, the target pressure setting portion 62 may compare the "pressure deviation between the operating target pressure and the actual pressure" and the "first pressure difference" based on a time from the start of change of the operating target pressure to the start of change of the actual pressure corresponding to the start of change of the operating target pressure.

The invention claimed is:

1. A vehicle brake device, in which a braking force is applied to a wheel of a vehicle in response to a hydraulic pressure of a brake fluid, comprising:
   a hydraulic pressure control portion which is configured to perform a feed-back control so that an actual hydraulic pressure of the brake fluid approximates an operating target pressure; and
   a target pressure setting portion configured to set an instruction target pressure on an actual hydraulic pressure side relative to the operating target pressure, when a pressure deviation between the operating target pressure which is a target value of the hydraulic pressure of the brake fluid corresponding to a brake operation and the actual hydraulic pressure is larger than a first pressure difference and at the same time when the actual hydraulic pressure is approaching the operating target pressure.

2. The vehicle brake device according to claim 1, wherein the target pressure setting portion is configured such that the lower a brake operation speed, the closer the instruction target pressure is set to the actual hydraulic pressure.

3. The vehicle brake device according to claim 1, wherein, the target pressure setting portion is configured to compare the pressure deviation between the operating target pressure and the actual pressure and the first pressure difference based on a time from a start of change of the operating target pressure to a start of change of the actual pressure corresponding to the start of change of the operating target pressure.

* * * * *